(12) United States Patent
Nishii

(10) Patent No.: US 7,836,286 B2
(45) Date of Patent: Nov. 16, 2010

(54) DATA PROCESSING SYSTEM TO CALCULATE INDEXES INTO A BRANCH TARGET ADDRESS TABLE BASED ON A CURRENT OPERATING MODE

(75) Inventor: Osamu Nishii, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 399 days.

(21) Appl. No.: 12/013,468

(22) Filed: Jan. 13, 2008

(65) Prior Publication Data
US 2008/0201562 A1    Aug. 21, 2008

(30) Foreign Application Priority Data
Feb. 21, 2007   (JP) ............... 2007-040708

(51) Int. Cl.
*G06F 9/44*    (2006.01)
(52) U.S. Cl. .................................... 712/233
(58) Field of Classification Search ............ 712/233
See application file for complete search history.

(56) References Cited

U.S. PATENT DOCUMENTS 5,671,434 A * 9/1997 Menadue et al. ......... 712/38
7,003,651 B2   2/2006 Kondoh et al.
2007/0106883 A1* 5/2007 Choquette ............. 712/225
2009/0204798 A1* 8/2009 Alexander et al. ...... 712/240

FOREIGN PATENT DOCUMENTS

JP   2002-14808 A    1/2002
JP   2002-229778 A   9/2002

* cited by examiner

*Primary Examiner*—Jacob Petranek
(74) *Attorney, Agent, or Firm*—Miles & Stockbridge P.C.

(57) ABSTRACT

The present invention provides a data processor or a data processing system which can be used in compatible modes among which the number of bits of an address specifying a logical address space varies at the time of referring to a branch address table by extension of displacement of a branch instruction. At the time of generating a branch address of a first branch instruction, the data processor or the data processing system optimizes a multiple with which a displacement is multiplied in accordance with the number of bits of an address specifying a logical address space, adds extended address information to the value of a register, and refers to a branch address table with address information obtained by the addition. The referred information is used as a branch address. To be adapted to a compatible mode using different number of bits of an address specifying a logical address space, it is sufficient to change a multiple with which the displacement is multiplied in accordance with the mode.

8 Claims, 13 Drawing Sheets

BRANCH ADDRESS TABLE ON MEMORY

- φ1  disp<BSR(32-BIT ADDRESS AREA DESIGNATION)→H
  disp≥BSR(64-BIT ADDRESS AREA DESIGNATION)→L

- φ2  64-BIT MODE→L
  32-BIT MODE→H

- φ3  FIRST BRANCH INSTRUCTION→H
  OTHER INSTRUCTION→L

- φ4  dispx4(LSH2)→H
  dispx8(LSH3)→L

FIG. 15

INSTRUCTION SEQUENCE IN THE CASE OF ABSOLUTE BRANCH TO Rn[63:0]

MOV.64b @(disp, PC), Rn  (16 BITS)
JMP64Rn  (16 BITS)

CONSTANT AREA
64-BIT DATA  (64 BITS)

BRANCH DESTINATION: INSTRUCTION  (32 BITS)

TOTAL 80 BITS

INSTRUCTION SEQUENCE IN THE CASE OF ABSOLUTE BRANCH TO {PC[63:32], Rn[31:0]}

MOV.L @(disp, PC), Rn  (16 BITS)
JSRCSRn  (16 BITS)

CONSTANT AREA
32-BIT DATA  (32 BITS)

BRANCH DESTINATION: INSTRUCTION  (32 BITS)

TOTAL 64 BITS (BRANCH RANGE OF JSRCS INSTRUCTION)

FIG. 18

| INPUT | | | OUTPUT |
|---|---|---|---|
| PC[31] | PC[30] | Rn[31:29] | SELECTING OPERATION |
| 0 | 0 | B'000~B'100 | SELECT PC[63:32] |
| | | B'101~B'111 | SELECT PC[63:32]-1 |
| | 1 | B'000~B'110 | SELECT PC[63:32] |
| | | B'111 | SELECT PC[63:32]-1 |
| 1 | 0 | B'000 | SELECT PC[63:32]+1 |
| | | B'001~B'111 | SELECT PC[63:32] |
| | 1 | B'000~B'010 | SELECT PC[63:32]+1 |
| | | B'011~B'111 | SELECT PC[63:32] |

DATA PROCESSING SYSTEM TO CALCULATE INDEXES INTO A BRANCH TARGET ADDRESS TABLE BASED ON A CURRENT OPERATING MODE

CROSS-REFERENCE TO RELATED APPLICATIONS

The disclosure of Japanese Patent Application No. 2007-40708 filed on Feb. 21, 2007 including the specification, drawings and abstract is incorporated herein by reference in its entirety.

BACKGROUND OF THE INVENTION

The present invention relates to a data processor or a data processing system and, more particularly, to a technique of generating a branch address. The invention relates to, for example, a technique effectively applied to a data processor capable of designating a branch address by a 64-bit absolute address in a logical address space specified by a 64-bit address.

A CPU (Central Processing Unit) in which logical address space is specified by 64 bits and the number of bits of a register is 64 bits is called a 64-bit CPU. For example, in the case of using a virtual storage in the 64-bit CPU, it is sufficient to designate a branch destination of a branch instruction in the range of the size of an instruction area of a process. For example, in the case where the instruction area of a single process is 4 GB (gigabytes) at the maximum, also in the case of designating a branch destination by an immediate address, 32 bits are sufficient for an address field. However, in a use which does not employ a virtual storage or in an operation of turning off a virtual storage, in a case such that a process instruction area is disposed exceeding 4 GB from the head of the memory space, even when the instruction area of a single process is smaller than 4 GB, in the case of designating a branch address by an immediate address, 64 bits are necessary for an address field and 64 bits or more are necessary for an instruction sequence. There is a technique of using a resister value to designate a 64-bit branch address while suppressing the number of bits necessary for an instruction sequence to a value less than 64 bits. Japanese Unexamined Patent Publication No. 2002-229778 discloses a technique of generating a branch address by adding a value obtained by code-extending displacement to the value of a program counter. Japanese Unexamined Patent Publication No. 2002-14808 discloses a technique of setting a value stored in a register as an upper-order address, setting a value stored in another register as a lower-order address, and combining the addresses to thereby generate a branch address.

SUMMARY OF THE INVENTION

The inventors of the present invention have examined operations of storing information of a branch address into a branch address table, and extending displacement of a branch instruction, thereby generating a memory access address of the branch address table. A memory area to be accessed has to correspond to the number of bits of the branch address. Considering a byte address which is assigned to data of one byte (eight bits), a memory address of eight addresses is required to access a 64-bit address from a memory. In the case of specifying the number of pieces of address information stored in a branch address table by the number of bits of displacement in an instruction, to access address information designated by the value m of the displacement, code extension on the displacement as described in Japanese Unexamined Patent Application Publication No. 2002-229778 is not sufficient. It is necessary to multiply the value "m" by eight to extend the address information to the address information of 64 bits. Using a memory address obtained by adding a base address to the extended address information of 64 bits as a reference, 64-bit data is read by a memory access, and read information is used as a branch address. However, in the case where such a branch instruction exists in a program of a 32-bit CPU, a method of computing a memory access address for reading a branch address to operate a 64-bit CPU in a mode compatible with a 32-bit CPU has to be changed. This is because extension of displacement depends on the number of bits of an address specifying a logical address space. In reference to the branch address table by extension of displacement, the system has to be adapted to a compatible mode in consideration of the above-described point.

In the technique of using values of two registers as an upper-order address and a lower-order address and employing information of the number of bits of the sum of the addresses as a branch address, in the case of using registers such as general registers as the two registers, a load instruction of setting data to each of the registers or a data transfer instruction has to be executed. Moreover, an instruction for pre-storing two pieces of data to be transferred to the registers into a memory is also necessary. As a result, reduction in description of a program or program amount is limited.

Further, in the case of separately preparing upper-order data and lower-order data of a branch address, a designation range by a lower address cannot exceed a boundary of an address range specified by the number of bits of the lower address (address boundary) due to an upper address near the address boundary. A problem occurs such that the branch range which can be designated by the lower address is biased.

An object of the present invention is to provide a data processor or a data processing system which can be adapted to a compatible mode of a different number of bits of an address specifying a logical address space in reference to a branch address table at the time of extension of displacement of a branch instruction.

Another object of the invention is to provide a data processor or a data processing system which can contribute to reduction in description of a program or program amount for an instruction using, as a branch address, information of the number of bits obtained by setting values of two registers as an upper address and a lower address and combining the upper and lower addresses.

Further another object of the present invention is to provide a data processor or a data processing system, in the case of separately preparing upper-order data and lower-order data of a branch address, capable of lessening a limitation such that a branch range in which an upper address can be designated by a lower address cannot exceed an address boundary specified by the number of bits of the lower address.

The above and other objects and novel features of the present invention will become apparent from the description of the specification and the appended drawings.

Outline of representative ones of inventions disclosed in the application will be briefly described as follows.

(1) At the time of generating a branch address of a first branch instruction, a data processor or a data processing system optimizes a multiple with which a displacement is multiplied in accordance with the number of bits of an address specifying a logical address space, adds extended address information to the value of a register, and refers to a branch address table with address information obtained by the addition. The referred information is used as a branch address. To be adapted to a compatible mode using different number of bits of an address specifying a logical address space, it is sufficient to change a multiple with which the displacement is multiplied in accordance with the mode.

(2) The data processor or the data processing system executes a data transfer instruction and stores data from a memory to a lower-order side of a first register. After that, the data processor or the data processing system executes a second branch instruction to generate a branch address by using the data stored on the lower-order side of the first register as lower-order address information of the branch address and using the upper-order data in a program counter as upper-order address information of the branch address. As compared with the case of fetching an absolute address made by full bits of a logical address as a branch address from a memory, the program amount can be reduced.

(3) At the time of executing a third branch instruction to generate a branch address, the data processor or the data processing system sets the information stored on the lower-order side of the first register designated by the instruction as lower address information of the branch address. As upper address information of the branch address, when a value specified by the lower-order information of the second register is located close to one of address boundaries specified by the upper-order information of the second register designated by the instruction and a value specified by the lower-order information of the first register is located close to the other address boundary, a value obtained by subtracting 1 from the upper-order information of the second register is used as the upper address information of the branch address. When a value specified by the lower-order information of the second register is located close to the other address boundary and a value specified by the lower-order information of the first register is located close to the one address boundary, a value obtained by adding 1 to the upper-order information of the second register is used as the upper address information of the branch address. Consequently, the branch range in which an upper address can be designated by a lower address can exceed the address boundary specified by the number of bits of the lower address.

Effects of the representative ones of the inventions disclosed in the application will be briefly described as follows.

In reference to the branch address table at the time of extending displacement of a branch instruction, the system can be adapted to a compatible mode using a different number of bits of an address specifying a logical address space.

In addition, the data processor or the data processing system can contribute to reduction in description of a program or program amount for an instruction using, as a branch address, information of the number of bits obtained by setting values of two registers as an upper address and a lower address and combining the upper and lower addresses.

Moreover, in the case of separately preparing upper-order data and lower-order data of a branch address, a limitation can be lessened such that a branch range in which an upper address can be designated by a lower address cannot exceed an address boundary specified by the number of bits of the lower address.

BRIEF DESCRIPTION OF DRAWINGS

FIG. 15 is an explanatory diagram showing that the amount of a program using a branch instruction can be reduced more than the case of fetching an absolute address made of full bits (64 bits) of a logical address as a branch address from a memory.

FIG. 18 is an explanatory diagram showing concrete, organized correspondence between the operation with −1, 0, or +1 on PC[63:32] and the values of first information Rn[31:29] and second information PC[31:30] in cases CAS1 to CAS4 in FIG. 7.

DETAILED DESCRIPTION OF PREFERRED EMBODIMENTS

1. Outline of Embodiments

Figure 1:
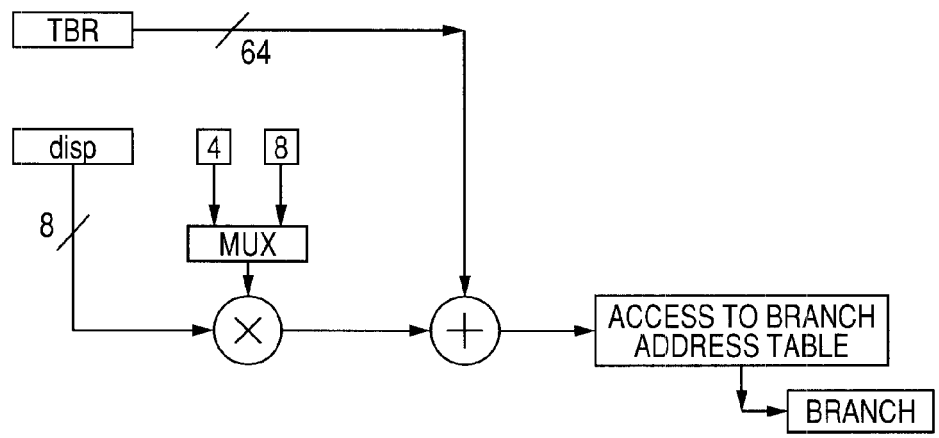
FIG. 1 is a block diagram showing a method of computing a branch address of a first branch instruction.

First, outline of representative embodiments of the present invention disclosed in the application will be described. Reference numerals in drawings referred to in the description of the representative embodiments simply illustrate components included in the concept.

(1) A data processor or a data processing system as a representative embodiment of the present invention can select a first operation mode using a logical address of "n" bits and a second operation mode using a logical address of n/2 bits, and has an instruction decoder 29 for decoding a first branch instruction and an arithmetic circuit 9 for computing a branch address on the basis of a result of decoding the first branch instruction. The first branch instruction is a branch instruction of adding the value of a first register (TBR) designated by the instruction and an offset obtained from the value of displacement included in the instruction, reading a branch address table using the addition value as an address, and using the read value as a branch address. The arithmetic circuit computes an offset by multiplying the value of the displacement by "m" times in the first operation mode, and computes an offset by multiplying the value of displacement by m/2 in the second operation mode. By changing the multiple with which the displacement is multiplied to m/2 in the second operation mode, a branch address stored in the branch address table can be obtained every n/2 bits from a necessary offset position. Consequently, also in a compatible mode of executing a program in the second operation mode, a normal branching operation according to the first branch instruction can be assured.

As a concrete mode, the first register is designated by an operation code in the first branch instruction. To designate the first register, a register instruction field other than an operation code field is not required. Thus, the invention contributes to reduce the number of bits of an instruction.

As another concrete mode, the displacement is a value indicating an address in reference to the base point of the branch address table designated by the first register, to which target address information is stored. Since the offset address is not designated directly, the number of instruction bits is small and adaptation to the second operation mode is easy.

As further another concrete mode, when n=64, M=8, and the displacement is made of 8 bits, for example, in the case of considering an instruction set in which the number of bits of an instruction code is eight, a branch address capable of designating, as the branch address, an absolute address of 64 bits can be realized by an instruction of the small number of bits such as 16 bits. It is sufficient to set the head address of the branch address table in the first register on the basis of a reset excepting handling or the like.

As further another concrete mode, the data processor has a memory 6 storing an entry of the branch address table. The speed of a memory access for generating a branch address can be increased.

As further another concrete mode, the data processor has a control circuit 3 for determining the first operation mode or the second operation mode in accordance with the state of an external terminal. With the configuration, the switching between the operation modes is easy.

As further another concrete mode, the data processor further includes a mode switching circuit (43) of executing the first branch instruction in the first operation mode in the case of detecting that the displacement value of the first branch instruction is a predetermined value when a second operation mode is designated according to the state of an external terminal or the control register. Consequently, also in the second mode, branch of extending a branch address in the first branch instruction to "n" bits can be dynamically selected. That is, the number of bits of the branch address according to the first branch instruction is not fixed in the first or second operation mode specified by the external terminal. For such a control, for example, the mode switching circuit has a second register (40), a comparator (41) for comparing the value of the second register and the value of the displacement of the first branch instruction, and a switching control logic (42), when the result of determination of the comparator is a predetermined result, of switching the multiple for the displacement value from m/2 to "m" times in the operation of the branch address according to the first branch instruction.

(2) The data processor as a representative embodiment of the invention from another aspect has an instruction decoder for decoding an instruction and an execution unit (9) for executing an instruction on the basis of the result of decoding by the instruction decoder. The data processor executes a data transfer instruction before execution of the second branch instruction. The data transfer instruction is an instruction of reading the memory in a program counter relative addressing mode and storing the read data to a lower-order side of a first register (Rn). The second branch instruction is a branch instruction of setting data (Rn[31:0]) stored on the lower-order side of the first register designated by the branch instruction as lower address information (IA[31:0]) of the branch address, and using an upper side (PC[63:32]) of address information stored in the program counter (22) as the remaining upper address information (IA[63:32]) of the branch address. As compared with the case of fetching the absolute address made of the full bits of the logical address as a branch address from the memory, the program amount can be reduced. However, the branch range in which an upper address can be designated by a lower address cannot exceed address boundary specified by the number of bits of the lower address.

As a concrete mode, each of the first register and a program counter is a 64-bit register, and each of the lower-order address information of the branch address and the upper-order address information of the branch address is made of 32 bits.

(3) A data processor as a representative embodiment of the present invention from another aspect has an execution unit (9) for executing a third branch instruction. The third branch instruction is an instruction of setting information (Rn[31:0]) stored on the lower-order side of a first register (Rn) as lower-order address information (IA[31:0]) of a branch address and using information (PC[63:32]) stored on the upper-order side of a second register (22) for generating the remaining upper-order address information (IA[63:32]) of the branch address. The execution unit uses a value obtained by subtracting 1 from the upper-order information of the second register as upper-order address information of the branch address when a value specified by the lower-order information of the second register is located closer to one of address boundaries specified by the upper-order information of the second register and a value specified by the lower-order information of the first register is located closer to the other address boundary. The execution unit uses a value obtained by adding 1 to the upper-order information of the second register as upper-order address information of the branch address when the value specified by the lower-order information of the second register is located closer to the other address boundary and the value specified by the lower-order information of the first register is located closer to the one of address boundaries. Consequently, the branch range in which an upper address can be designated by a lower address can exceed the address boundary specified by the number of bits of the lower address. The branch range can exceed the address boundary in the case where the value specified by the lower-order information of the second register and the value specified by the lower-order information of the first register are located closer to the opposite sides of the address boundary. In such a case, a branch address can be designated in a range close to the value of the second register.

As a concrete mode, each of the first and second registers is a 64-bit register, and each of the lower-order address information of the branch address and the upper-order address information of the branch address is made of 32 bits.

As a further another concrete mode, the first register is a general register, and the second register is a program counter.

As a further another concrete mode, the execution unit has an arithmetic circuit (27) for computing a branch address on the basis of a result of decoding of the third branch instruction. The arithmetic circuit receives first information (Rn[31: 29]) as a plurality of bits on the most significant side in information (Rn[31:0]) stored on the lower-order side of the first register (Rn: general register) and second information (PC[31:30]) as a plurality of bits on the most significant side in information (PC[31:0]) stored on the lower-order side of the second register (22: program counter). When the first information is large ([101,111], [111]) in the case where the value of the second information is small ([00], [01]), the arithmetic circuit uses a value obtained by subtracting 1 from the upper-order information (PC[63:32]) of the second register as the remaining upper-order address information (IA[63: 32]) of the branch address. When the first information is smaller ([000 to 100], [000 to 110]) than the value, the arithmetic circuit uses the upper-order information (PC[63:32]) of the second register as it is as the remaining upper-order address information of the branch address. In such a manner, a branch address is generated. When the first information is small ([000], [000 to 010]) in the case where the value of the second information is large ([10], [11]), the arithmetic circuit uses a value obtained by adding 1 to the upper-order information of the second register as the remaining upper-order address information of the branch address. When the first information is larger ([001 to 111], [011 to 111]) than the value, the arithmetic circuit uses the upper-order information of the second register as it is as the remaining upper-order address information of the branch address. In such a manner, a branch address is generated. Consequently, the branch range in which the upper address of the second register can be designated by the lower address of the first register can exceed the address boundary specified by the number of bits of the lower address. The branch range can exceed the address boundary in the case where the value specified by the lower-order information of the second register (22) and the value specified by the lower-order information of the first register (Rn) are located closer to the opposite sides of the address boundary. The case can be easily determined by the first and second information. As a result, a branch address can be designated in a range closer to the value of the second register more than the case of computing a branch address by simply adding the lower-order information of the first register and the upper-order information of the second register.

2. Details of the Embodiments

Embodiments will be described more specifically.

Microcomputer

Figure 4:
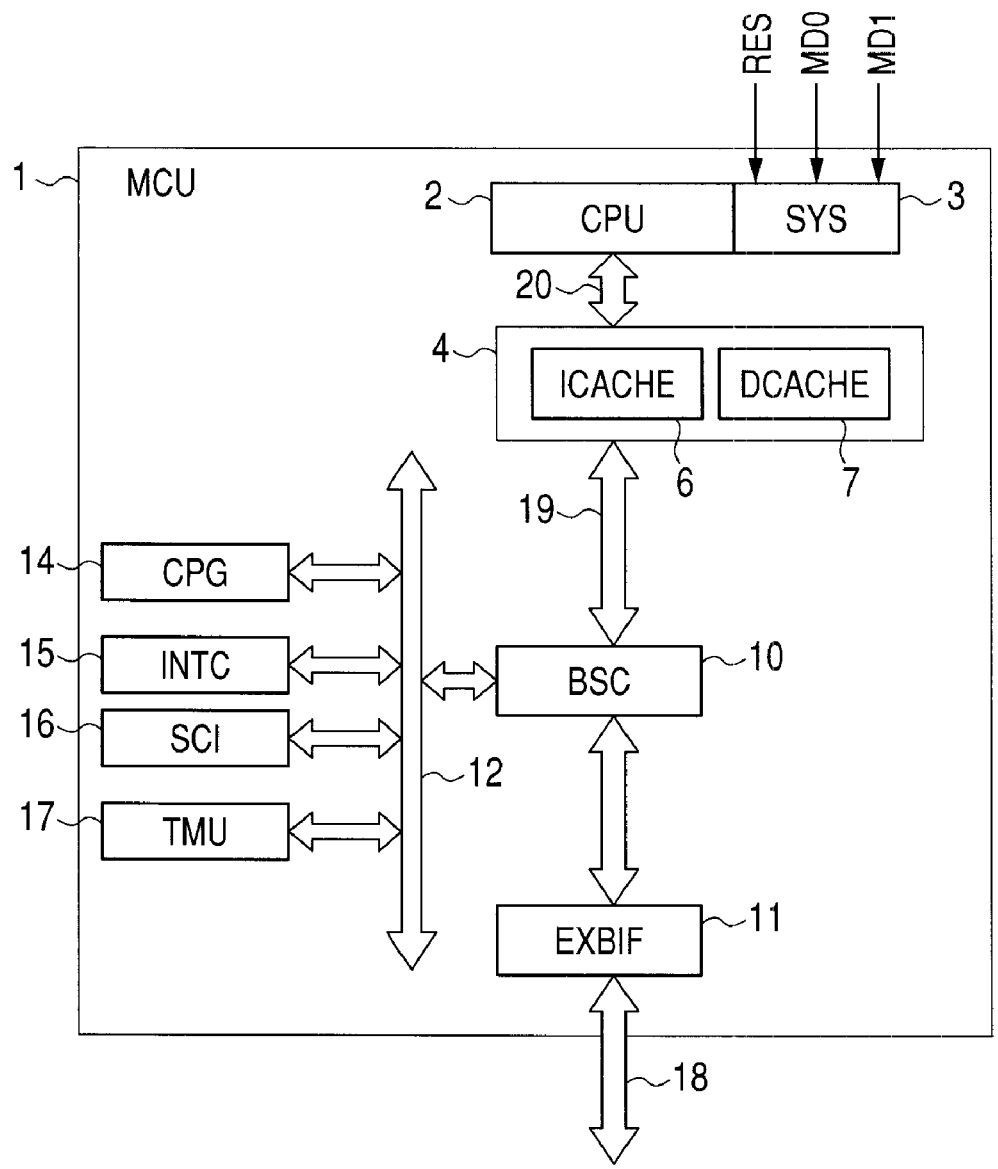
FIG. 4 is a block diagram showing an example of a data processor or a data processing system according to the present invention.

FIG. 4 shows an example of the data processor of the present invention. A microcomputer 1 shown in the diagram has, as core circuits, a central processing unit (CPU) 2, a system controller (SYS) 3, and a cache unit 4. The CPU 2 and the cache unit 4 are connected to each other via a system bus 20. When a reset instruction given from a reset terminal RES is cancelled, the system controller 3 determines the operation mode of the microcomputer in accordance with states of mode terminals MD0 and MD1. For example, the scale of the logical address space is designated according to the operation mode. An operation mode using a 64-bit logic address will be called a first operation mode (64-bit mode). An operation mode using a 32-bit logic address will be called a second operation mode (32-bit mode). The CPU 2 executes an instruction of a program in accordance with a predetermined sequence. The cache unit 4 has, although not limited, an instruction cache memory (ICACHE) 6 and a data cache memory (DCACHE) 7. The instruction cache memory 6 is an associative memory holding an instruction fetched recently. The data cache memory 7 is an associative memory holding data accessed recently. In the cache memories 6 and 7, valid/invalid state of a cache or a cache target address area is set in an initializing process after cancellation of reset. Although not limited, the microcomputer 1 using no virtual memory will be taken as an example.

The cache unit 4 is connected to a bus controller (BSC) 10 via a cache bus 19. The bus controller 10 is connected to an external bus interface circuit (EXBIF) 11 and a peripheral bus 12. To the peripheral bus 12, for example, a clock pulse generator (CPG) 14, an interruption controller (INTC) 15, a serial interface circuit (SCI) 16, and a timer unit (TMU) 17 representatively shown are connected. The bus controller 10 controls the peripheral bus 12 and an external bus 18 by controlling bus access parameters such as the number of access cycles and the number of input/output bits of parallel data in response to an access request from the CPU or the cache unit.

Figure 5:
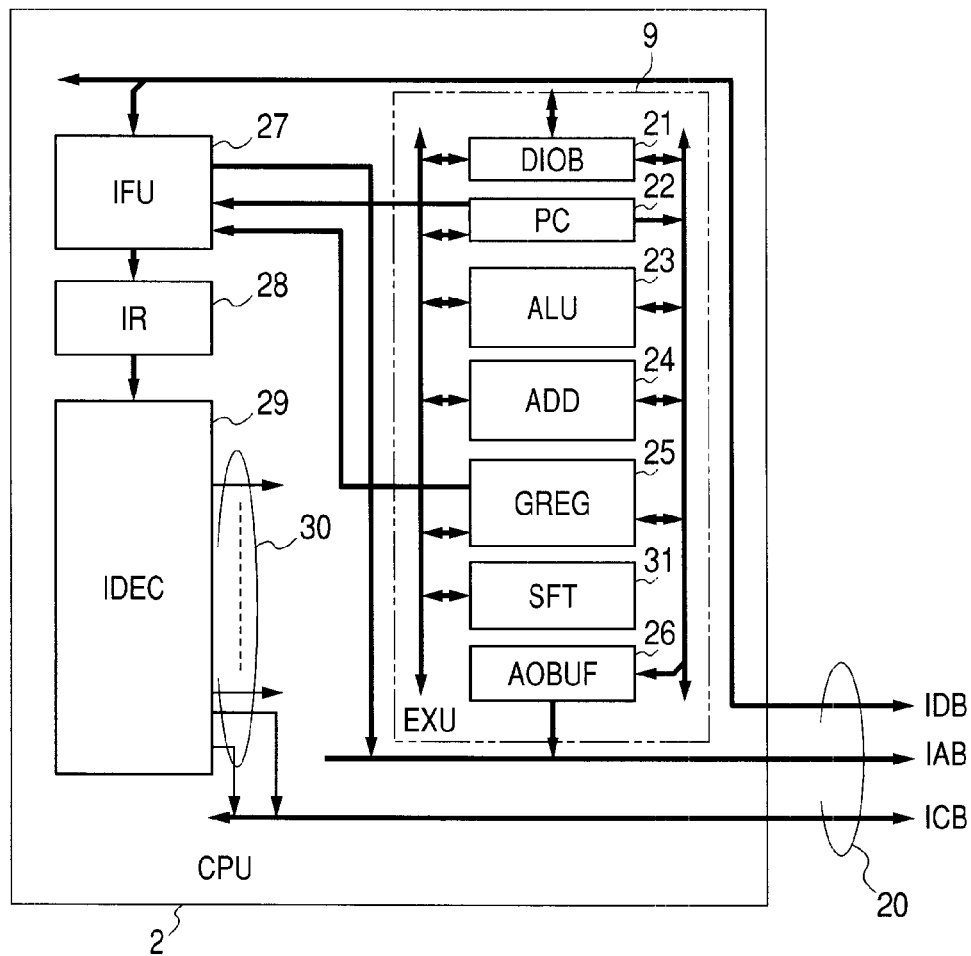
FIG. 5 is a block diagram showing the details of a CPU.

FIG. 5 shows the CPU 2. The system bus 20 is constructed by a data bus IDB of 64 bits, an address bus IAB of 64 bits, and a controller bus ICB. The system bus 20 has, as instruction execution unit (EXU) 9, a data input/output buffer (DIOB) 21 connected to the data bus IDB, a program counter (PC) 22, an arithmetic and logic unit (ALU) 23, an adder (ADD) 24, a general register circuit (GREG) 25 having a plurality of general registers, a shifter (SFT) 31, and an address output buffer (AOBUF) 26 connected to the address bus IAB, which are connected to each other via buses XBUS and YBUS. Each of the program counter 22 and the general registers is a register of 64 bits. The program counter 22 is a register storing an instruction address to be executed next.

As instruction control units, an instruction fetch unit (IFU) 27, an instruction register (IR) 28, and an instruction decoder (IDEC) 29 are provided. The instruction fetch unit 27 generates an instruction fetch address in accordance with a predetermined algorithm, stores an instruction in a queuing buffer, and outputs the stored instruction to the instruction register (IR) 28 in accordance with the execution sequence of the instruction. When an addressing mode such as a program counter relative addressing mode or a register relative addressing mode is necessary to generate an instruction address such as a branch address responding to the branch instruction, the value of the program counter 22 and the value of a general register designated by an instruction can be referred to. The instruction decoder 29 generates an internal control signal 30 by decoding an instruction loaded to the instruction register 28, and a part of the internal control signal 30 is given to the control bus ICB and supplied to the outside of the CPU 2.

Correspondence to First Branch Instruction

FIG. 1 shows an example of a method of computing a branch address in accordance with a first branch instruction. An instruction set of the CPU 2 includes, for example, a first branch instruction marked as "JSR/N@@(disp, TBR)". Although not limited, the length of the instruction word of the first branch instruction is 16 bits. As an example, an operation code is made of eight bits (which vary among branch instructions) and a displacement field is made of eight bits. A TBR denotes a table base register indicative of the head address of a branch address table on a memory. The register TBR is designated implicitly by an operation code. For example, the register TBR may be a general register implicitly designated or a specific memory area implicitly designated. A displacement "disp" is a value indicating the address counted from the base point of the branch address table in which target address information is stored. The displacement "disp" does not directly designate an offset address. The first instruction is a branch instruction obtained by adding the value of the register TBR designated by the instruction and the offset obtained from the value of the displacement "disp" included in the instruction, reading a branch address table using the addition value as an address, and using the read value for the branch address. An instruction fetch unit computes an offset by multiplying the value of the displacement "disp" by eight times in the 64-bit mode, and an offset by multiplying the value of the displacement "disp" by four times in the 32-bit mode. In FIG. 1, for convenience, the multiple of four or eight is selected by a multiplexer (MUX).

Figure 6:
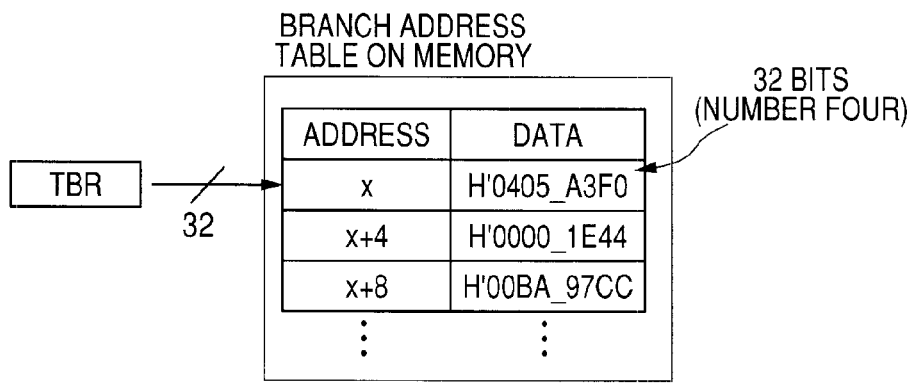
FIG. 6 is an explanatory diagram showing correspondence between address mapping of a branch address table in a 32-bit mode and a branch address stored in the table.
Figure 7:
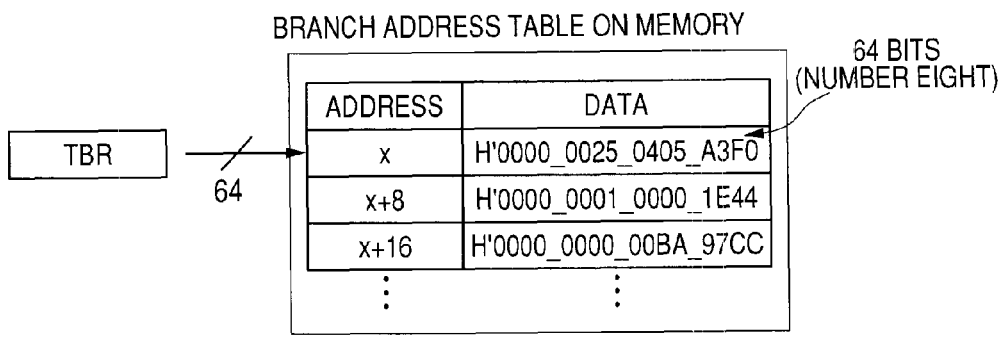
FIG. 7 is an explanatory diagram showing correspondence between address mapping of a branch address table in a 64-bit mode and a branch address stored in the table.

FIG. 6 shows the correspondence between address mapping and branch addresses in the branch address table in the 32-bit mode. FIG. 7 shows the correspondence between memory address mapping and the branch addresses in the branch address table in the 64-bit mode. In each of the diagrams, an address 'x' indicates the table head address designated by the value of the table base register TBR. In the diagram, an address managed by the CPU 2 is a byte address and can designate data of one byte by one-address. In the 32-bit mode, the logical address is made of 32 bits. Consequently, as shown in FIG. 6, four addresses are necessary to store one branch address of 32 bits. Therefore, in the 32-bit mode, by multiplying the displacement "disp" by four, an offset memory address is generated. Similarly, in the 64-bit mode, since eight addresses are required to store one branch address of 64 bits, by multiplying the displacement "disp" by four, an offset memory address is generated as shown in FIG. 7.

Figure 8:
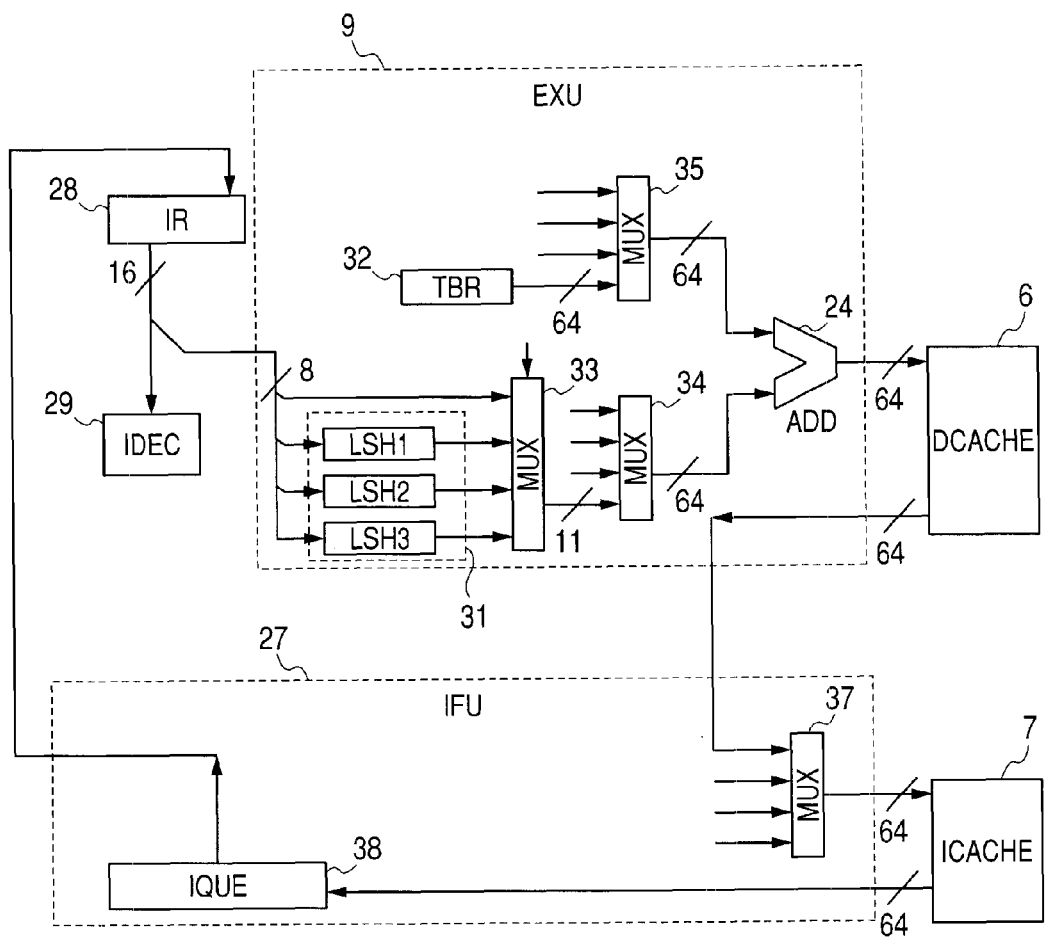
FIG. 8 is a block diagram showing a concrete circuit configuration for realizing the computing method of FIG. 1.

FIG. 8 shows a concrete circuit configuration for realizing the computing method of FIG. 1. In the instruction execution unit (EXU) 9 described with reference to FIG. 5, the shifter 31 has a 1-bit left shifter LSH1, a 2-bit left shifter LSH2, and a 3-bit left shifter LSH3. Although multiplexers (MUX) 33 to 35 shown in FIG. 8 are not shown in FIG. 5, the multiplexers (MUX) 33 to 35 select outputs of the registers and shifters in accordance with a control signal output from the instruction decoder and the like. In the diagram, reference numeral 32 is designated to the table base register (TBR). When the first branch instruction is executed, the values of eight bits in the displacement "disp" of the instruction are input to the shifter 31. The 2-bit left shifter LSH2 outputs the value of four times as large as the input value, and the 3-bit left shifter LSH3 outputs the value of eight times as large as the input value. Although a multiplexer 37 shown in the instruction fetch unit 27 is not illustrated in FIG. 5, the multiplexer 37 denotes a circuit for selecting an instruction fetch address to be output from the instruction decoder in accordance with a control signal output from the instruction decoder. An instruction queue (IQUE) 38 is an instruction buffer for queuing fetched instructions in an FIFO (First In First Out) manner. To the instruction register IR 28, an instruction held in the instruction queue 28 is loaded.

Figure 9:
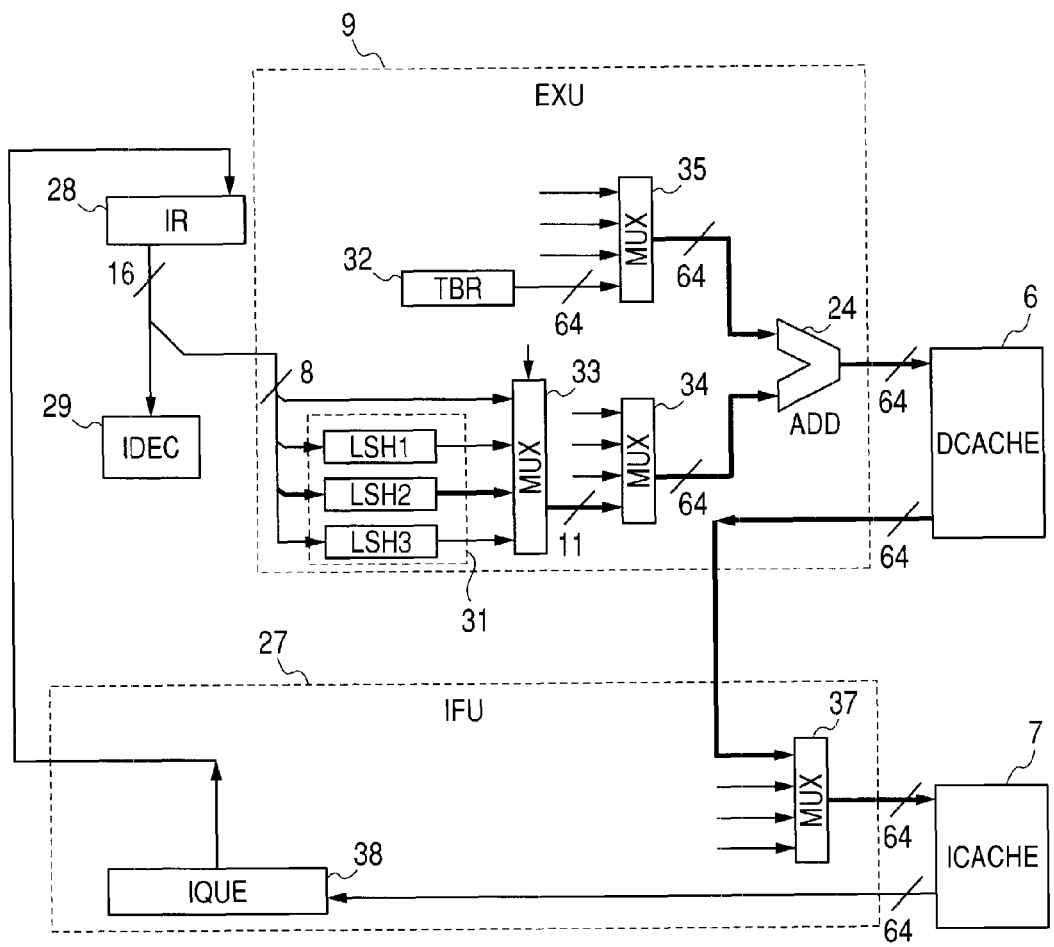
FIG. 9 is a block diagram in which a branch address computing path at the time of executing a first branch instruction in a 32-bit mode is illustrated in thick solid lines.

In FIG. 9, a branch address computing path used at the time of executing the first branch instruction in the 32-bit mode is illustrated by solid lines. In the 32-bit mode, lower 32 bits of each of the values of various 64-bit registers are valid bits. The value of the displacement "disp" of eight bits is multiplied by four times in the 2-bit left shifter LSH2, thereby generating an offset address. The offset address is added to the table base address in the table base register (TBR) 32 by the adder (ADD) 24. With the added address, the memory is accessed. On the other hand, when there is a cache hit in the data cache memory 7, the branch address information of 32 bits from the hit is read out. When a cache miss occurs, address information of 32 bits directly read from a not-shown branch address table connected on the outside of the microcomputer 1 is obtained via the external bus interface circuit 11. The obtained branch address information is output from the instruction fetch unit 27. In response to the information, when a cache hit occurs, the instruction cache memory 6 fetches an instruction from the cache hit. When a cache miss occurs, an instruction is directly fetched from a not-shown, program memory connected on the outside of the microcomputer 1 via the external bus interface circuit 11. The fetched instruction is loaded to the instruction register 28, and a process instructed by the branch instruction is executed.

Figure 10:
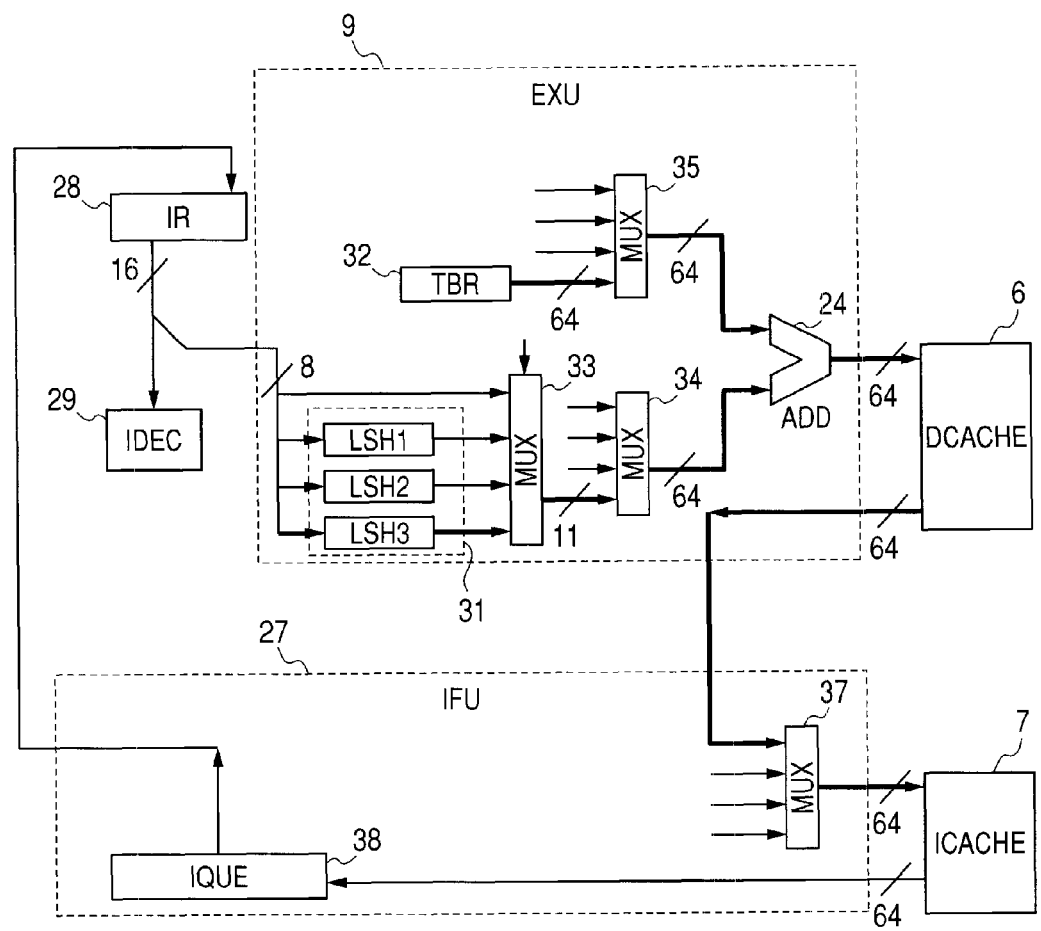
FIG. 10 is a block diagram in which the branch address computing path at the time of executing the first branch instruction in a 64-bit mode is illustrated in thick solid lines.

In FIG. 10, a branch address computing path used at the time of executing the first branch instruction in the 64-bit mode is illustrated by solid lines. In the 64-bit mode, full bits of each of the values of various 64-bit registers are valid bits. In this case, the value of the displacement "disp" of eight bits is multiplied by eight times in the 3-bit left shifter LSH3, thereby generating an offset address. The offset address is added to the table base address in the table base register (TBR) 32 by the adder (ADD) 24. With the added address, the memory is accessed to obtain branch address information of 64 bits from the data cache memory 7 or directly from the branch address table. The other operations are similar to those of FIG. 9.

Figure 11:
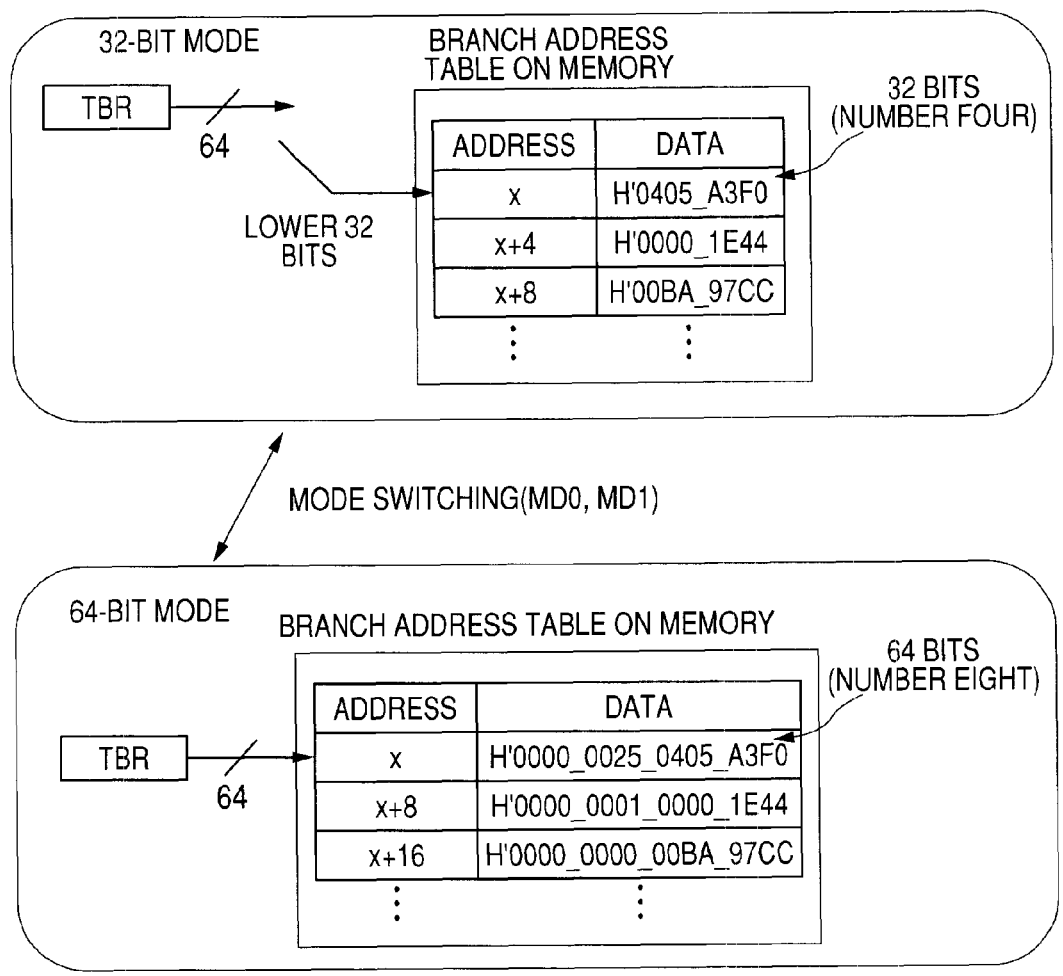
FIG. 11 is an explanatory diagram showing the difference in use modes of the branch address tables according to designation of the 32-bit mode and the 64-bit mode by mode terminals MD0 and MD1.

The multiplexer 33 selects an output of the 2-bit left shifter LSH2 in the 32-bit mode in FIG. 9, and selects an output of the 3-bit left shifter LSH3 in the 64-bit mode in FIG. 10. A control can be employed, which fixedly determines an output selected in the execution of the first branch instruction in accordance with the states of the mode terminals MD0 and MD1. That is, as shown in FIG. 11, in the 32-bit mode or 64-bit mode according to the states of the mode terminals MD0 and MD1, the selecting control is performed on the basis of an output of the system controller 3. In this case, the method of computing a branch address in the first branch instruction is fixedly determined by switching of the operation mode by the mode terminals MD0 and MD1 accompanying the reset.

Figure 12:
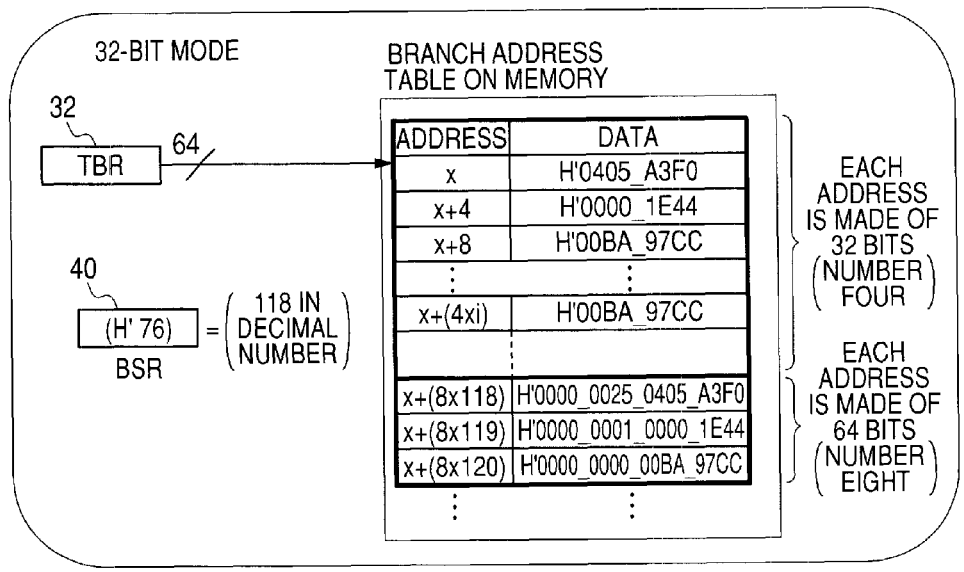
FIG. 12 is an explanatory diagram showing address mapping of a branch address table and stored information, by which a branch address of a first branch instruction can be selectively extended to 64 bits when the 32-bit mode is set by the mode terminals MD0 and MD1.
Figure 13:
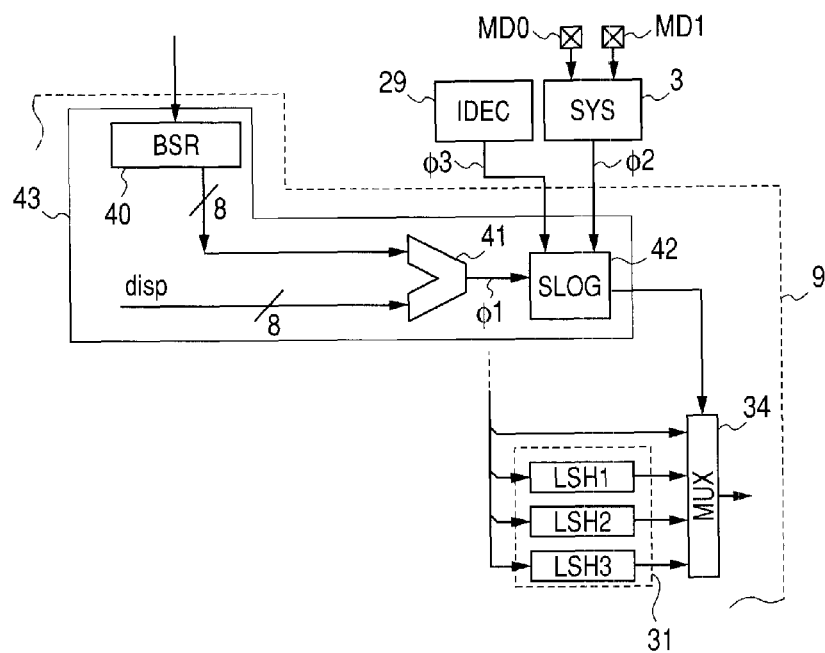
FIG. 13 is a block diagram showing the logic configuration for selectively extending a branch address to 64 bits.

FIGS. 12 and 13 show an example in which a branch address of the first branch instruction can be selectively expanded to 64 bits when the 32-bit mode is set by the mode terminals MD0 and MD1. FIG. 12 shows information stored in the branch address table. FIG. 13 shows a logic configuration for selectively extending the branch address to 64 bits.

In the 32-bit mode, the branch address table has, for example, a storage area of 32 bits×256, and the displacement "disp" is made of eight bits. As shown in FIG. 12, the branch address of 32 bits is stored on the lower side of the branch address table, and the branch address of 64 bits is stored in the upper side. A boundary setting register 40 sets an entry number specified by eight bits. The entry number denotes a number which can be designated by the displacement "disp" of eight bits. In the example of the diagram, a branch address of 32 bits is stored in the location lower than an entry number H'76 (118 in decimal number) in the branch address table. In the entry number 118 or larger, 64-bit branch addresses are stored.

In FIG. 13, reference numeral 43 denotes a mode switching circuit for selectively executing the first branch instruction in the first operation mode when the second operation mode is designated according to the states of the mode terminals MD0 and MD1. A magnitude comparator 41 compares the displacement "disp" of the first branch instruction and the value of the boundary setting register 40, and a signal φ1 of the result of determination is supplied to a switch control logic 42. The switch control logic (SLOG) 42 receives an internal mode signal φ2 output from the system controller 3 and a single decode signal φ3 output from the instruction decoder 29 and outputs a switch control signal φ4 to the multiplexer 34 in accordance with the combination of levels of the input signals φ1 to φ3.

Figure 14:
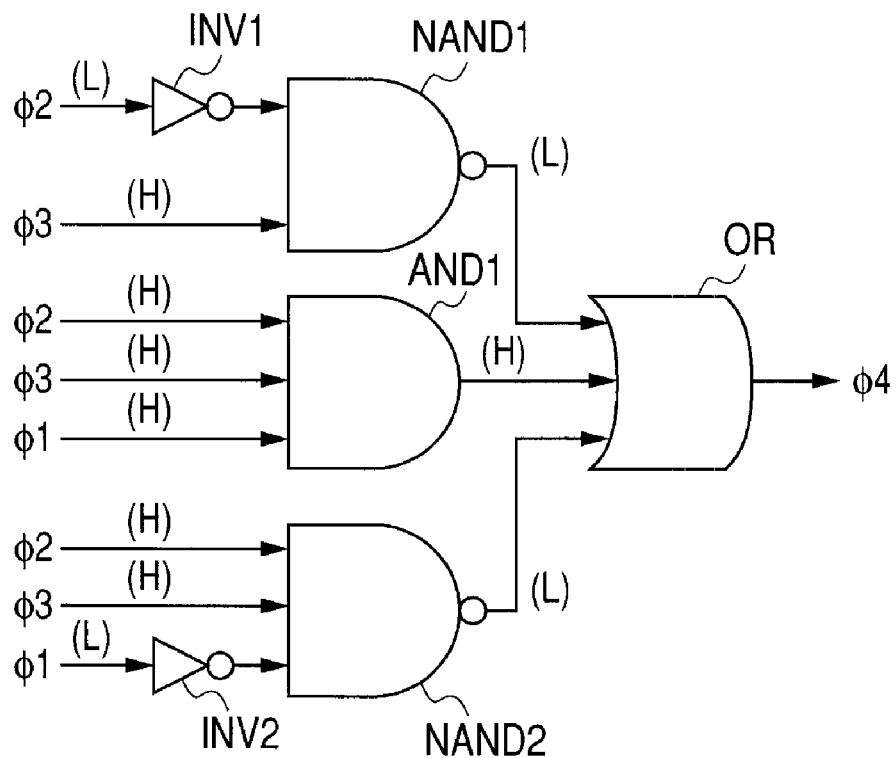
FIG. 14 is a logic circuit diagram showing the logic configuration of a switch control logic.

FIG. 14 shows the logic configuration of the switch control logic. The determination signal φ1 is at the high level (H) when the value "disp" is smaller than the value of BSR (the 32-bit address area is designated), and is at the low level (L) when the value "disp" is equal to or larger than the value of BSR. The control signal φ2 is set to the high level (H) when the 32-bit mode is designated by the mode terminals MD0 and MD1, and is set to the low level (L) when the 64-bit mode is designated. The control signal φ3 is set to the high level (H) when the operation code of the first branch instruction is decoded. When the control signal φ4 is at the high level, an output of LSH2 (an output of the value which is four times as large as the value "disp") is selected. When the control signal φ4 is at the low level, an output of LSH3 (an output of the value which is eight times as large as the value "disp") is selected.

When the 64-bit mode is set (φ2=L) and the first branch instruction is decoded (φ3=H), the switch control logic 42 selects an output of the LSH3 obtained by multiplying the value "disp" by eight times (φ4=L). The logic is realized by an NAND gate NAND1 and an inverter INV1 in FIG. 14. When the 32-bit mode is set (φ2=H), the first branch instruction is decoded (φ3=H), and "disp<BSR" is detected (φ1=H), the switch control logic 42 selects an output of the LSH2 obtained by multiplying the value "disp" by four (φ4=H). The logic is realized by an AND gate AND1 in FIG. 14. When the 32-bit mode is set (φ2=H), the first branch instruction is decoded (φ3=H), and "disp<BSR" is not detected (φ1=H), the switch control logic 42 selects an output of the LSH3 obtained by multiplying the value "disp" by eight times (φ4=L). This logic is realized by a NAND gate NAND2 and an inverter INV2 in FIG. 14. An OR circuit receives outputs of the NAND gates NAND1 and NAND2 and the AND gate AND and outputs the control signal φ4.

The microcomputer 1 executing the first branch instruction produces the following effects.

(1) By changing the multiple with which the displacement "disp" is multiplied from eight to four in accordance with the 32-bit mode, a branch address stored in the branch address table can be obtained from a necessary offset position every 32 bits. Consequently, also in a compatible mode of executing a program in the 32-bit mode, a normal branching operation according to the first branch instruction can be guaranteed.

(2) To designate the table base register TBR, a register instruction field other than the operation code field of the first branch instruction is not required. Thus, it can contribute to reduce the number of bits of an instruction.

(3) The displacement "disp" is the value indicative of an address counted from the base point of a branch address table designated by the table base register TBR, in which target address information is stored. Since an offset address is not directly designated, the number of bits of an instruction is small. By a simple operation of changing the value of a multiple for the displacement "disp", the system can be set in the 32-bit mode.

(4) Since the microcomputer has a data cache memory that stores entry data of a branch address table, the speed of a memory access for generating a branch address can be increased.

(5) Since the system has the system controller 3 for determining the 32-bit mode or the 64-bit mode in accordance with the states of the mode terminals MD0 and MD1, the mode can be switched easily.

(6) Since the switch control logic in FIGS. 13 and 14 is employed, when the 32-bit mode is set according to the mode terminals MD0 and MD1, the branch address of the first branch instruction can be selectively extended to 64 bits.

Correspondence to Second Branch Instruction

Figure 2:
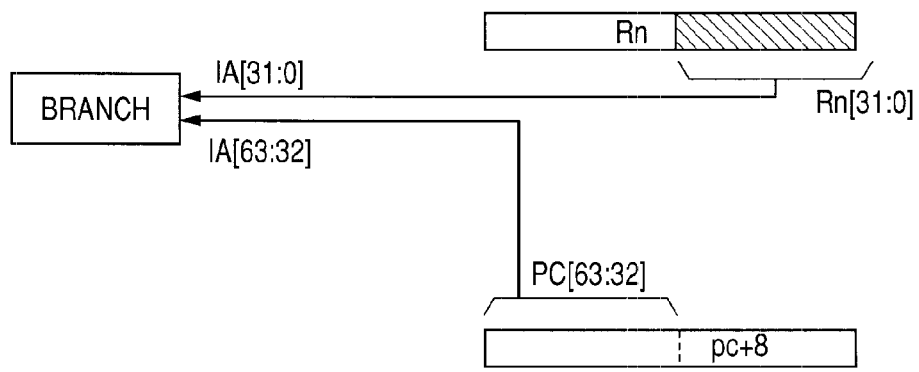
FIG. 2 is a block diagram showing a method of computing a branch address of a second branch instruction.

FIG. 2 shows an example of a method of computing a branch address in accordance with a second branch instruction. An instruction set of the CPU 2 includes, for example, a second branch instruction marked as "JSRCS Rn". Although not limited, the length of the instruction word of the second branch instruction is 16 bits, an operation code is made of eight bits and, in addition, a register designation field is provided. The instruction has, as a branch address, a 64-bit address (AI[63:0]) using upper 32 bits (PC[63:32]) of a program counter (PC) implicitly designated by the operation code as an upper side (AI[63:32]) and using lower 32 bits (Rn[31:0]) of a general register Rn instructed with a register designation field as a lower side (AI[31:0]). Before the branch instruction, it is necessary to execute an instruction of loading to the register Rn. For example, a data transfer instruction expressed as "MOV.L@(disp8, PC), Rn" is executed. The data transfer instruction is an instruction of reading a memory in a program counter relative addressing mode and storing the read data to the lower side of the register Rn. For example, an offset address is computed by multiplying the displacement "disp" of eight bits by eight, and adding the computed offset address to the value (pc) of the program counter, thereby generating a memory access address. Using the memory access address, the data read from the memory is stored into the general register Rn.

By the second branch instruction, as compared with the case of fetching the absolute address made of full bits (64 bits) of the logical address as a branch address from the memory, the program amount using the branch instruction can be reduced. For example, as shown in FIG. 15, in the case of performing branching using a 64-bit address stored in the general register Rn, a 64-bit data transfer instruction "MOV.64b@(disp, PC), Rn" is executed and, after that, the branch instruction "JMP64 Rn" using the 64 bits of the register Rn is executed. In this case, a data sequence of 64 bits has to be assured in a constant area in program description to specify a branch address of 64 bits. For the program, description of a data sequence of 64 bits is necessary in addition to an instruction sequence of 32 bits made of two instructions of a data transfer instruction and a branch instruction. On the other hand, in the case of using the second branch instruction, the data sequence of 32 bits is necessary in the constant area.

Figure 16:
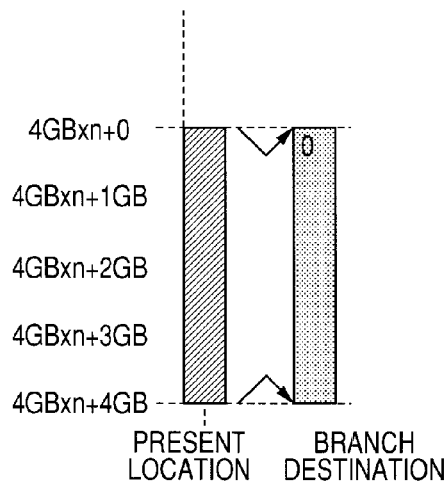
FIG. 16 is an explanatory diagram showing that an address range in which an address can be branched in a second branch instruction is limited to the range of an address space of four gigabytes in which the second branch instruction is mapped at present.

In the case of using the second branch instruction, a branch range in which an upper address can be designated by a lower address cannot exceed an address boundary specified by the number of bits of the lower address. As shown in FIG. 16, the range in which an address can be branched is limited to the range of an address space of four gigabytes in which the second branch instruction is mapped at present.

Correspondence to Third Branch Instruction

Figure 3:
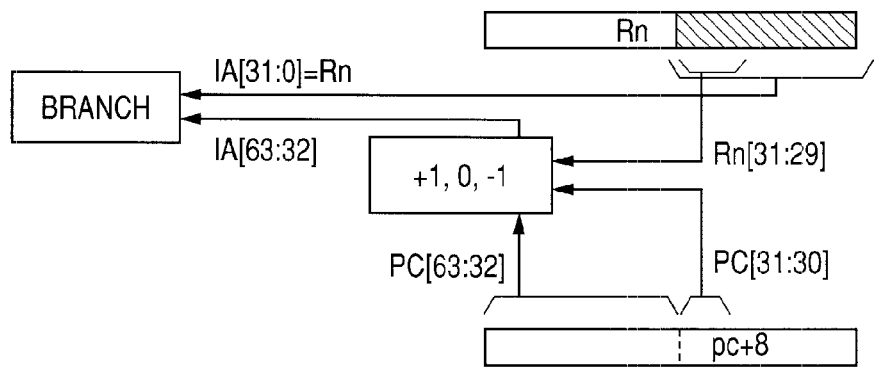
FIG. 3 is a block diagram showing a method of computing a branch address of a third branch instruction.

FIG. 3 shows an example of a method of computing a branch address in accordance with a third branch instruction. An instruction set of the CPU 2 includes, for example, a third branch instruction marked as "JSRCS Rn". Although not limited, the length of the instruction word of the third branch instruction is 16 bits, an operation code is made of eight bits and, in addition, a register designation field is provided. The instruction has, as a branch address, a 64-bit address (AI[63:0]) using, as an upper side (AI[63:32]), a value obtained by selectively performing an operation of +1, 0, or −1 to the upper 32 bits (PC[63:32]) of a program counter (PC) implicitly designated by the operation code, and using lower 32 bits (Rn[31:0]) of a general register Rn instructed with a register designation field as a lower side (AI[31:0]). Before the branch instruction, it is necessary to execute an instruction of loading to the register Rn. For example, a data transfer instruction expressed as "MOV.L@(disp8,PC),Rn" which is the same as that in the case of the second instruction is executed. Data read from a memory in the program counter relative addressing mode with displacement to the lower side of the register Rn.

To perform the selective operation with +1, 0, or −1, the instruction fetch unit 27 fetches first information Rn[31:29] of the upper three bits of the lower 32 bits of the register Rn and second information PC[31:30] of the upper two bits of the lower 32 bits of the program counter (PC) 22. The instruction fetch unit 27 selectively performs the operation with +1, 0, or −1 on the information PC[63:32] of the upper 32 bits of the program counter 22 on the basis of the relation between the fetched first information Rn[31:29] and the fetched second information PC[31:30]. IA[63:32] obtained as a result of the operation is set as the upper address information of the branch address, and the lower address information of the branch address is set as IA[63:32]=Rn[31:0].

Figure 17:
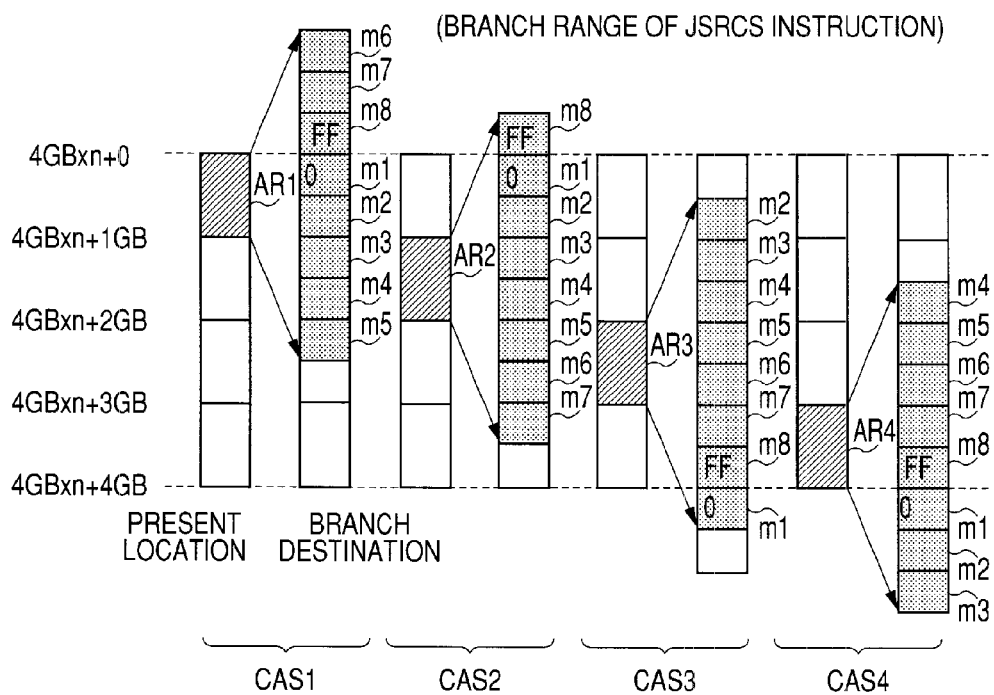
FIG. 17 is an explanatory diagram showing the principle of the selective operation with +1, 0, or −1 performed by an instruction fetch unit in computation of a branch address of a third branch instruction.

FIG. 17 shows the principle of the selective operation with +1, 0, or −1 by the instruction fetch unit 27. The information PC[63:32] of the upper 32 bits of the program counter 22 specifies the location of an address space of four gigabytes. The address mapping in the address space of the four gigabytes is specified by the information PC[31:0] of the lower 32 bits. According to the second information PC[31:30] of the program counter 22 at the time of execution of the third branch instruction, the situation is divided into cases CAS1 to CAS4. In the case CAS1, the value of PC[63:0] lies in a hatched area AR1 in which PC[31:30]=0,0. In the case CAS2, the value of PC[63:0] lies in a hatched area AR2 in which PC[31:30]=0,1. In the case CAS3, the value of PC[63:0] lies in a hatched area AR3 in which PC[31:30]=1,0. In the case CAS4, the value of PC[63:0] lies in a hatched area AR4 in which PC[31:30]=1,1. In each of the cases CAS1 to CAS4, the range of four gigabytes which can be designated by information Rn[31:0] of the lower 32 bits of the register Rn is set so as to be uniformly mapped to the upper side and the lower side using the corresponding hatch area AR1, AR2, AR3, or AR4 as a center. On the basis of the three bits of the first information Rn[31:29], the position of the address mapping in the four gigabytes of the lower 32 bits Rn[31:0] of the register Rn, in m1 to m8 is determined. In the case CAS1, when the address mapping lies in m1 to m5, the operation with +0 (no operation) is performed on PC[63:32]. When the address mapping lies in m6 to m8, the operation with +1 is performed on PC[63:32]. Similarly, in the case CAS2, when the address mapping lies in m1 to m7, the operation with +0 (no operation) is performed on PC[63:32]. When the address mapping lies in m8, the operation with +1 is performed on PC[63:32]. In the case CAS3, when the address mapping lies in m3, the operation with −0 is performed on PC[63:32]. When the address mapping lies in m2 to m8, the operation with +0 (no operation) is performed on PC[63:32]. In the case CAS4, when the address mapping lies in m1 to m3, the operation with −1 is performed on PC[63:32]. When the address mapping lies in m4 to m8, the operation with +0 (no operation) is performed on PC[63:32].

FIG. 18 shows the concrete, organized correspondence between the operation with −1, 0, or +1 on PC[63:32] and the values of the first information Rn[31:29] and the second information PC[31:30] in the cases CAS1 to CAS4.

Figure 19:
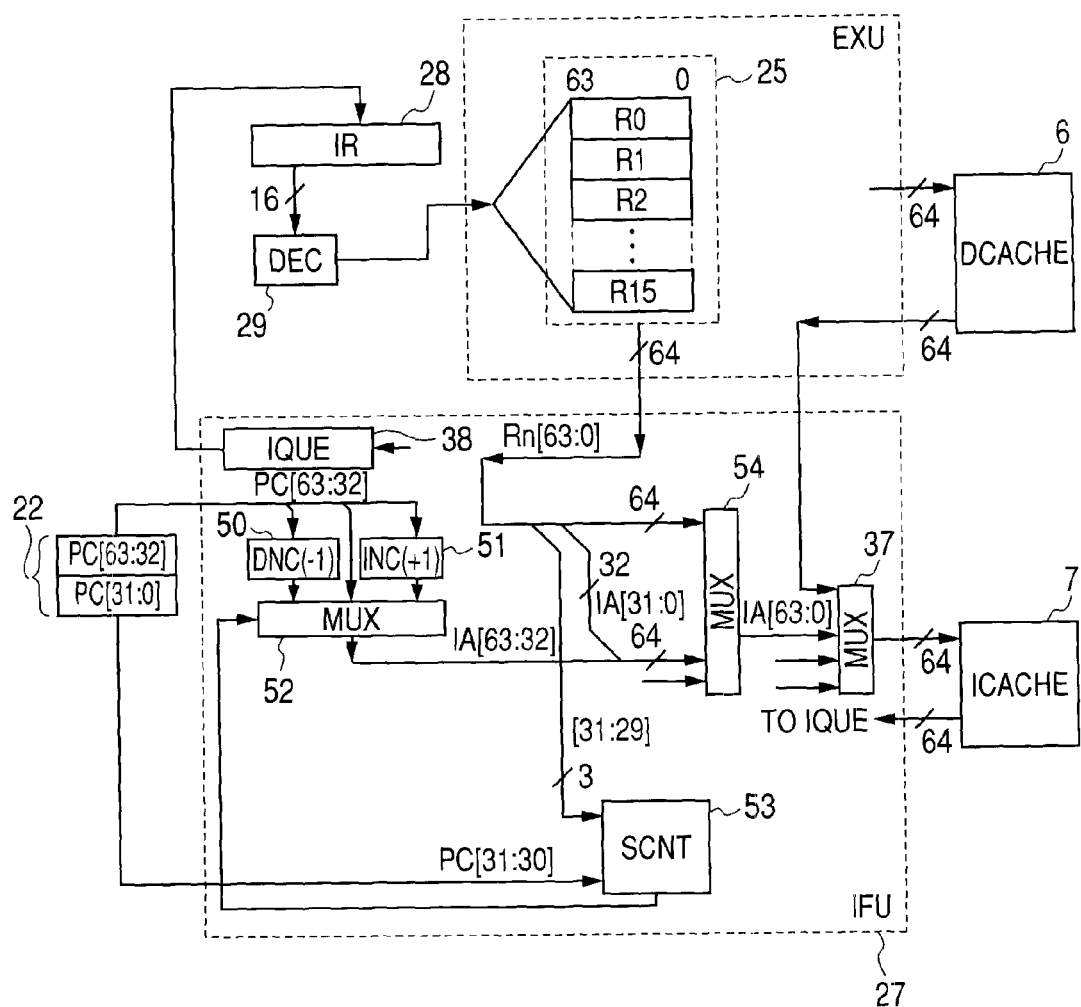
FIG. 19 is a block diagram showing a concrete circuit configuration for realizing the branch address computing method described with reference to FIG. 3 in the third branch instruction.

FIG. 19 shows a concrete circuit configuration for realizing the branch address computing method described with reference to FIGS. 3 and 17. The instruction fetch unit 27 has a decrementer 50 for decrementing PC[63:32] by one and an incrementer 51 for incrementing PC[63:32] by one. A multiplexer (MUX) 52 can select PC[63:32], an output of the decrementer 50, or an output of the incrementer 51. A selection control circuit (SCNT) 53 receives the first information Rn[31:29] and the second information PC[31:30] and generates a selection control signal of the multiplexer 52 so as to obtain an operation result as described with reference to FIGS. 17 and 18 for the inputs. Specifically, when the value of the second information PC[31:30] is small, a value obtained by subtracting one from the information PC[63:32] of the upper 32 bits of the program counter 22 with respect to the first information Rn[31:29] is used as the upper address information IA[63:32] of the branch address. For the first information Rn[31:29] smaller than the value, the information PC[63:32] of the upper 32 bits of the program counter 22 is used as it is as the upper address information IA[63:32] of the branch address. When the value of the second information PC[31:30] is large, a value obtained by adding one to the information PC[63:32] of the upper 32 bits of the program counter 22 with respect to the first information Rn[31:29] is used as the upper address information IA[63:32] of the branch address. For the first information Rn[31:29] larger than the value, the information PC[63:32] of the upper 32 bits of the program counter 22 is used as it is as the upper address information IA[63:32] of the branch address.

In accordance with a result of decoding of the third branch instruction, a multiplexer 54 uses the information Rn[31:0] of the lower 32 bits of a register selected by the general register circuit 25 as the lower information IA[31:0] of the branch address, and uses 32 bits selected by the multiplexer 52 as the upper information IA[63:32] of the branch address. The branch address IA[63:0] selected by the multiplexer 54 is used for an instruction access via the multiplexer 37. The branched instruction read is stored in the instruction queue 38, loaded to the instruction register IR, and executed.

According to the third branch instruction, the branch range which can be designated by the lower address Rn[32:0] of the general register for the upper address PC[63:32] of the program counter 22 can exceed the address boundary specified by the number of bits of the lower address Rn[32:0]. The branch address is made exceed the address boundary in the case where a value specified by information of the lower bits of the program counter 22 and a value specified by information of lower bits of the general register Rn are on the side opposite to the address boundary. The case can be easily determined by the first information Rn[31:29] and the second information PC[31:30]. As a result, as compared with the case of simply adding the information of lower bits of the general register Rn and the information of upper bits of the program counter 22, thereby setting the result as a branch address, the branch address can be designated in a range close to the value of the program counter 22.

The invention achieved by the inventors herein has been concretely described on the embodiment. However, obviously, the invention is not limited to the embodiment but can be variously modified without departing from the gist.

For example, the present invention can be applied also to a microcomputer capable of using a virtual storage. The length of an instruction and the number of address bits are not limited to the above but can be properly changed. The present invention is not limited to a microcomputer but can be widely applied to a semiconductor integrated circuit of a system-on-chip on which an accelerator for performing image process, sound process, encoding/decoding process, or the like is mounted and, further, a data processor or the like formed as a multi-chip module.

What is claimed is:

1. A data processor capable of selecting a first operation mode using a logical address of "n" bits and a second operation mode using a logical address of n/2 bits, comprising:
   an instruction decoder for decoding a first branch instruction; and
   an arithmetic circuit for computing a branch address on the basis of a result of decoding of the first branch instruction,
   wherein the first branch instruction is a branch instruction of adding a value of a first register designated by the instruction and an offset obtained from a value of displacement included in the instruction, reading a branch address table using the addition value as an address, and using the read value for a branch address, and
   wherein the arithmetic circuit computes an offset by multiplying the displacement value by "m" in the first operation mode, and computes an offset by multiplying the displacement value by m/2 in the second operation mode.

2. The data processor according to claim 1, wherein the first register is designated by an operation code of the first branch instruction.

3. The data processor according to claim 1, wherein the displacement is a value indicative of the location of an address counted from base point of a branch address table designated by the first register, in which target address information is stored.

4. The data processor according to claim 3, wherein the "n" is 64, the displacement is made of eight bits, and the "m" is eight.

5. The data processor according to claim 4, further comprising a memory for storing a data entry in the branch address table.

6. The data processor according to claim 1, further comprising a control circuit for determining the first operation mode or the second operation mode in accordance with a state of an external terminal.

7. The data processor according to claim 6, wherein the control circuit further comprises a mode switch circuit for executing the first branch instruction in the first operation mode in the case where the displacement value of the first branch instruction is detected to be a predetermined value when the second operation mode is designated according to the state of the external terminal.

8. The data processor according to claim 7, wherein the mode switch circuit has a second register, a comparator for comparing the value of the second register and the displacement value of the first branch instruction with each other, and a switch control logic, when a result of the comparison performed by the comparator is a predetermined result, for switching a multiple for the displacement value from m/2 to m in computation of a branch address according to the first branch instruction.

* * * * *